United States Patent
Lim et al.

(10) Patent No.: US 11,422,587 B2
(45) Date of Patent: *Aug. 23, 2022

(54) DISPLAY DEVICE

(71) Applicant: Samsung Display Co., Ltd., Yongin-si (KR)

(72) Inventors: Kiho Lim, Suwon-si (KR); Seong-nyeon Kim, Cheonan-si (KR); Jun-woo Kim, Hwaseong-si (KR); Keehyun Nam, Seoul (KR); Hyesuk An, Daegu (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/242,485

(22) Filed: Apr. 28, 2021

(65) Prior Publication Data
US 2021/0247802 A1 Aug. 12, 2021

Related U.S. Application Data

(63) Continuation of application No. 16/455,614, filed on Jun. 27, 2019, now Pat. No. 11,023,001.

(30) Foreign Application Priority Data

Aug. 1, 2018 (KR) .......... 10-2018-0090012

(51) Int. Cl.
*G06F 3/0481* (2022.01)
*G06F 3/14* (2006.01)
(Continued)

(52) U.S. Cl.
CPC .......... *G06F 1/1605* (2013.01); *G06F 3/0412* (2013.01); *G06F 3/0481* (2013.01); *G06F 3/1423* (2013.01); *H04N 5/2257* (2013.01)

(58) Field of Classification Search
CPC .................................................. G06F 1/1605
(Continued)

(56) References Cited

U.S. PATENT DOCUMENTS 10,134,826 B2 11/2018 Ka et al.
10,186,191 B2 1/2019 Kang et al.
(Continued)

FOREIGN PATENT DOCUMENTS

KR 10-2017-0065059 6/2017
KR 10-2017-0111827 10/2017
(Continued)

OTHER PUBLICATIONS

Non-Final Office Action dated Apr. 15, 2020, issued in U.S. Appl. No. 16/455,614.
(Continued)

*Primary Examiner* — Javid A Amini
(74) *Attorney, Agent, or Firm* — H.C. Park & Associates, PLC (57) ABSTRACT

A display device includes: a display panel including: a first area defined by an area corresponding to an opening in the display panel, the first area configured not to display an image; and a display area surrounding the first area and configured to display an image; and a first electronic module disposed in the opening of a lower part of the display panel overlapping the first area, wherein the display device is configured to display a first boundary image in a part of the display area adjacent to a boundary between the first area and the display area, and wherein the display device is configured to provide predetermined information to a user through a combination of the first area and the first boundary image.

16 Claims, 7 Drawing Sheets

(51) Int. Cl.
  *G06F 1/16* (2006.01)
  *G06F 3/041* (2006.01)
  *H04N 5/225* (2006.01)
(58) Field of Classification Search
  USPC .......................................................... 345/619
  See application file for complete search history.

(56) References Cited

U.S. PATENT DOCUMENTS

| | | | |
|---|---|---|---|
| 11,023,001 B2* | 6/2021 | Lim | ................. G06F 1/1626 |
| 2006/0158588 A1 | 7/2006 | Uh et al. | |
| 2010/0163880 A1 | 7/2010 | Jeon | |
| 2010/0328275 A1 | 12/2010 | Yamazaki | |
| 2014/0009704 A1 | 1/2014 | Pijman et al. | |
| 2015/0144934 A1* | 5/2015 | Rappoport | ............ G09G 3/3208 257/40 |
| 2016/0011633 A1 | 1/2016 | Watanabe et al. | |
| 2016/0112667 A1* | 4/2016 | Park | ................. G06F 3/017 348/739 |
| 2017/0162111 A1 | 6/2017 | Kang et al. | |
| 2017/0186400 A1* | 6/2017 | Song | ................. G06F 1/1643 |
| 2017/0287992 A1 | 10/2017 | Kwak et al. | |
| 2017/0294502 A1 | 10/2017 | Ka et al. | |
| 2018/0017996 A1* | 1/2018 | Ryu | ................. G06F 1/1647 |

FOREIGN PATENT DOCUMENTS

| | | |
|---|---|---|
| KR | 10-2017-0117291 | 10/2017 |
| KR | 10-2017-0122887 | 11/2017 |
| KR | 10-1927438 | 12/2018 |

OTHER PUBLICATIONS

Final Office Action dated Nov. 2, 2020, issued in U.S. Appl. No. 16/455,614.

Notice of Allowance dated Mar. 4, 2021, issued in U.S. Appl. No. 16/455,614.

* cited by examiner

DISPLAY DEVICE

CROSS-REFERENCE TO RELATED APPLICATION

This application is a Continuation of U.S. patent application Ser. No. 16/455,614, filed on Jun. 27, 2019, and claims priority from and the benefit of Korean Patent Application No. 10-2018-0090012, filed on Aug. 1, 2018, each of which is hereby incorporated by reference for all purposes as if fully set forth herein.

BACKGROUND

Field

Exemplary implementations of the invention relate generally to a display device having an always-on display mode.

Discussion of the Background

A display device may be various types such as a mobile phone, a smart phone, a tablet computer, a notebook computer, a wearable device, and the like.

When a user views simple information like a clock, since the display device is restarted, on/off is frequently repeated. In order to reduce such inconvenience of users, in the standby state, an always-on display (AOD) mode function is added to the display device to always display the information specified by the user such as clock, calendar, and the like on the screen.

Also, as the area of the display area disposed on the front surface of the display device increases, a camera module or a sensor module disposed in the display area may reduce the user recognition of information displayed in the display area.

The above information disclosed in this Background section is only for understanding of the background of the inventive concepts, and, therefore, it may contain information that does not constitute prior art

SUMMARY

Devices constructed according to exemplary implementations/embodiments of the invention are capable of improving the aesthetics of a display device and to provide information necessary for a user by using images displayed in a display area in the always-on mode and shapes of some parts recognized in the display area.

Additional features of the inventive concepts will be set forth in the description which follows, and in part will be apparent from the description, or may be learned by practice of the inventive concepts.

According to one or more exemplary embodiments of the invention, a display device includes: a display panel including: a first functional area configured not to display an image; and a display area surrounding the first functional area, the display area configured to display an image; and a first functional module including a first lens disposed at a lower part of the display panel overlapping the first functional area, wherein the display panel is configured to: display a first always-on image in a part of the display area adjacent to the first functional area in response to the display device being in an always-on mode; and display a general image in the entire display area in response to the display device being in a normal display mode, and switch from the always-on mode to the normal display mode according to an input signal received from a user, and wherein the display device is configured to, in the always-on mode, provide a predetermined information to a user through a combination of the first functional area and the first always-on image.

The predetermined information may be status information indicating a current status.

The status information may include information corresponding to a current time.

The status information may include information corresponding to a remaining battery level of the display device.

The status information may include information corresponding to points of the compass.

The predetermined information may correspond to an alarm signal.

The predetermined information may be an emoticon having a specific expression.

The first functional area may overlap an opening formed in the display panel.

The display panel may include a base layer, a circuit layer disposed on the base layer, a light emitting element layer disposed on the circuit layer, and an encapsulation layer sealing the light emitting element layer. The first functional area may overlap a first opening formed on the circuit layer and a second opening formed on the light emitting element layer.

The first functional module may further include a sensor for receiving light incident through the first lens.

The first functional module may further include a light emitting module for emitting light through the first lens.

The display device may further include: a second functional area surrounded by the display area, the second functional area configured not to display an image.

The display device may further include a second functional module including a second lens disposed under the display panel overlapping the second functional area.

The display panel may be configured to display a second always-on image in a part of the display area adjacent to the second functional area in response to the display device being in the always-on mode, and the display device may be configured to, in the always-on mode, provide the predetermined information to the user by the first functional area, the second functional area, the first always-on image, and the second always-on image.

According to one or more exemplary embodiments of the invention, a display device includes: a display panel including: a functional area defined by an opening formed in the display panel; and a display area defined as an area where a plurality of light emitting elements are arranged, surrounding the functional area; and a functional module including a lens disposed overlapping the functional area, wherein only some of the plurality of light emitting elements of the display panel are configured to emit light in response to the display device being in a low power mode, and wherein all of the plurality of light emitting elements are configured to emit light in response to the display device being in a general mode; and wherein the display device is configured to, in the low power mode, provide a predetermined information to a user formed by the boundary between the functional area and the display area and an image formed by light emission of the some of the plurality of light emitting elements.

The predetermined information may include status information indicating a current status.

The status information may include at least one of information corresponding to a current time, information corresponding to a remaining battery level of the display device, and information corresponding to points of the compass.

The predetermined information may correspond to an alarm signal.

The predetermined information may be an emoticon having a specific expression.

The functional module may further include a sensor for receiving light incident through the first lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Each of FIGS. 3A, 3B, 3C, and 3D illustrates a modified exemplary embodiment corresponding to the AA portion of FIG. 1.

Each of FIGS. 5A, 5B, 5C, and 5D illustrates a modified exemplary embodiment corresponding to the BB portion of FIG. 4.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
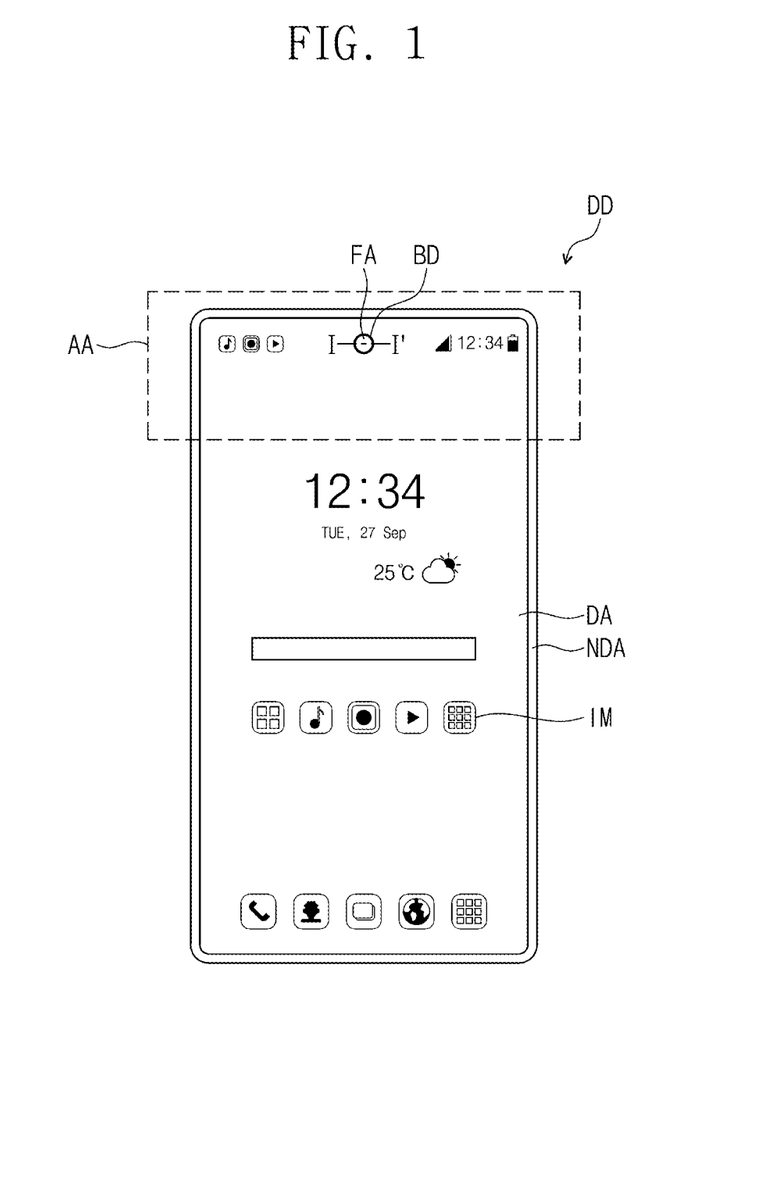
FIG. 1 illustrates an exemplary display device constructed according to an exemplary embodiment.
Figure 2A:
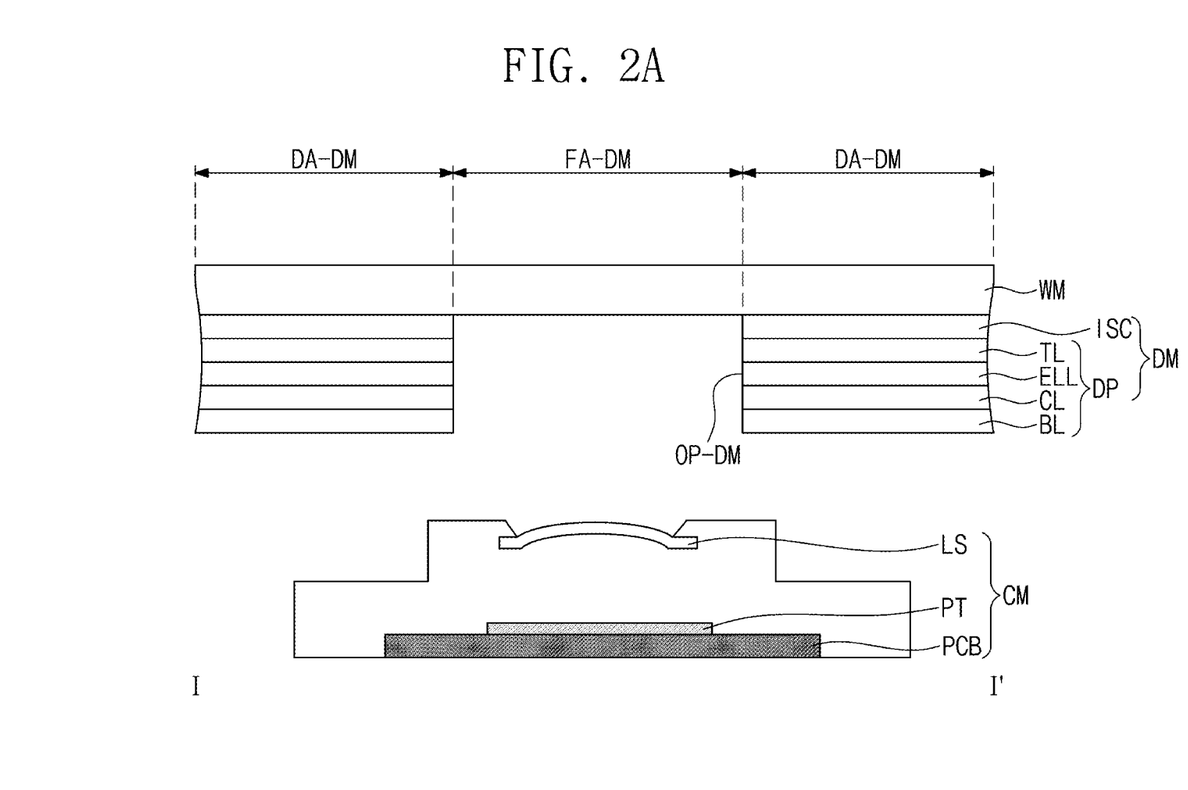
FIGS. 2A and 2B illustrate cross-sectional views taken along a sectional line of FIG. 1, respectively.
Figure 2B:
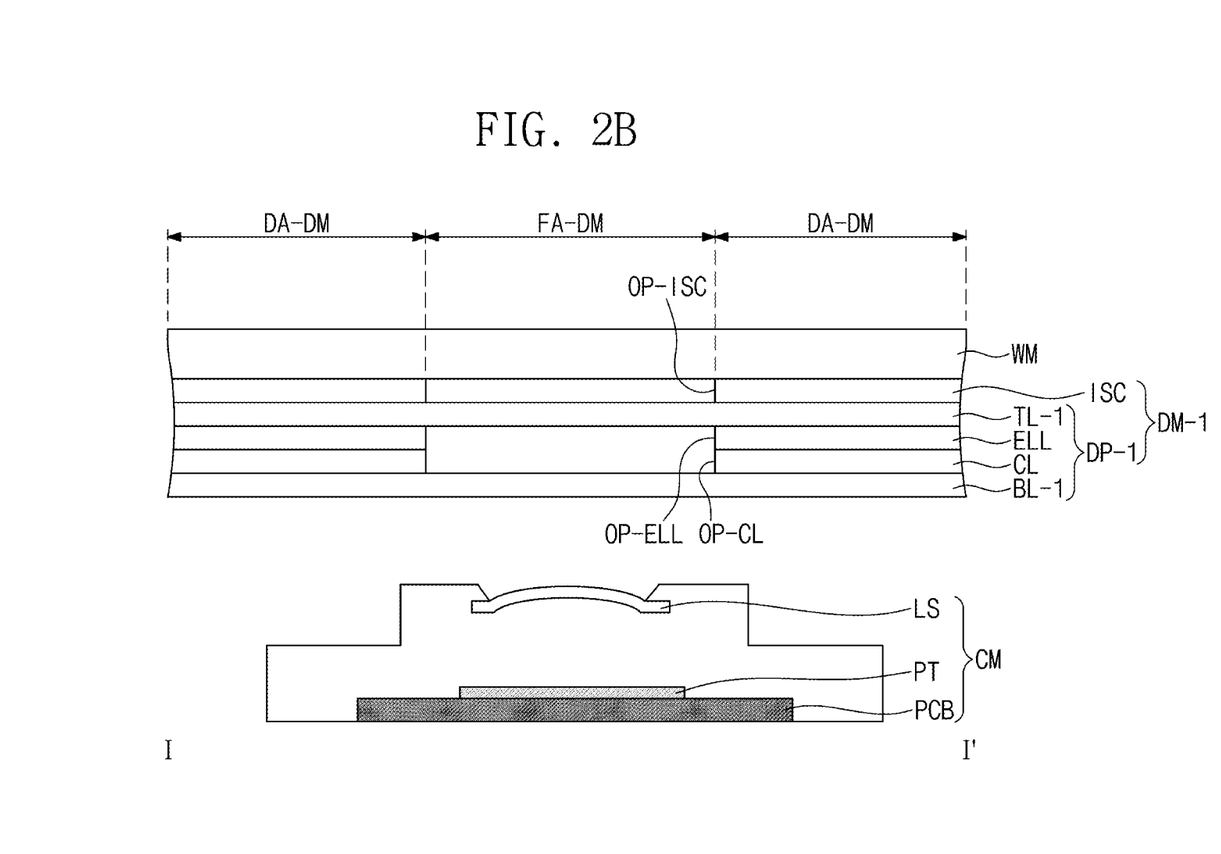

FIG. 1 is a view illustrating an exemplary display device DD according to an exemplary embodiment. FIGS. 2A and 2B illustrate cross-sectional views taken along a sectional line of FIG. 1, respectively.

The display device DD may be used for small and medium-sized electronic devices such as mobile phones, tablets, car navigations, game consoles, and smart watches in addition to large-sized electronic devices such as televisions and monitors.

As shown in FIG. 1, a display area DA, a non-display area NDA, and a functional area FA may be defined in the display device DD.

The display area DA may be defined as an area where an image IM is displayed. FIG. 1 shows application icons and a clock window as an example of the image IM.

The non-display area NDA surrounds the display area DA and may be defined as an area where the image IM is not displayed.

The functional area FA may be defined as an area where the image IM is not displayed and a user may perform a specific function. The specific function may include, for example, a photographing function, an external object proximity detection function, an infrared ray detection function, an iris recognition function, a face recognition function, or a light emission function.

The functional area FA may be surrounded by the display area DA. The boundary BD between the functional area FA and the display area DA may be viewed by the users of the display device DD. In addition, the functional area FA itself may be distinguished from the display area DA and may be viewed by users.

Referring to FIG. 2A, the display device DD may include a window member WM, a display module DM, and a functional module CM.

The window member WM may include a transparent material for transmitting light emitted from the display module DM. The window member WM may include a glass or polymeric material.

The display module DM may include a display panel DP and an input sensing circuit ISC.

The input sensing circuit ISC is capable of sensing externally applied touch and/or pressure.

In an exemplary embodiment, the input sensing circuit ISC may be placed directly on the display panel DP. Here, the direct placement means that the input sensing circuit ISC is disposed on the display panel DP without a separate adhesive member.

In another exemplary embodiment, the input sensing circuit ISC may be disposed on the display panel DP by an adhesive member.

The display area DA-DM and the functional area FA-DM may be defined in the display module DM. The display area DA-DM and the functional area FA-DM of the display module DM correspond to the display area DA (see FIG. 1) and the functional area FA (see FIG. 1), respectively.

The display panel DP may include a base layer BL, a circuit layer CL, a light emitting element layer ELL, and an encapsulation layer TL.

The base layer BL may include a plastic substrate, a glass substrate, a metal substrate, or an organic/inorganic composite material substrate as a flexible substrate. In an exemplary embodiment, the base layer BL may have a rigid nature, and in other embodiments, the base layer BL may have a flexible nature.

The circuit layer CL is disposed on the base layer BL. The circuit layer CL may include an organic layer and an inorganic layer. The circuit layer CL may include a plurality of transistors. The circuit layer CL may provide an electrical signal to the light emitting element layer ELL through the transistors.

The light emitting element layer ELL is disposed on the circuit layer CL. The light emitting element layer ELL may include a plurality of light emitting elements. In an exemplary embodiment, the light emitting elements may be organic light emitting diodes. However, the inventive concept is not limited thereto, and the light emitting elements may be a micro Light Emitting Diode (LED) or a quantum dot LED.

The light emitting element layer ELL may receive an electrical signal from the circuit layer CL and emit light. The image IM (see FIG. 1) may be formed by the light emitted to the light emitting element layer ELL.

The encapsulation layer TL is placed on the light emitting element layer ELL and may seal the light emitting element layer ELL. The encapsulation layer TL may protect the light emitting element layer ELL from foreign substances such as moisture and dust.

In an exemplary embodiment, the encapsulation layer TL may be in the form of a substrate spaced apart from the light emitting element layer ELL. In another exemplary embodiment, the encapsulation layer TL may be in the form of a thin film disposed directly on one side of the light emitting element layer ELL.

An opening OP-DM may be defined in the display module DM. In an exemplary embodiment, the functional area FA-DM of the display module DM may be defined as the area corresponding to the opening OP-DM of the display module DM.

The functional module CM is disposed at the lower part of the display module DM. The functional module CM may be, for example, a camera module, an infrared sensor module, a light emitting module, or an iris recognition module.

The functional module CM may include a lens LS, a functional component PT, and a circuit board part PCB.

The lens LS may be disposed overlapping the functional area FA-DM of the display module DM.

The functional component PT may be placed at the lower part of the lens LS. The functional component PT may be mounted on the circuit board part PCB to perform a predetermined function.

In an exemplary embodiment, if the functional module CM is a camera module, the functional component PT may be an image sensor that receives light through the lens LS. The image sensor may be, for example, a charge coupled device (CCD) sensor or a complementary metal oxide semiconductor (CMOS) sensor.

In an exemplary embodiment, when the functional module CM is an infrared sensor module, the functional component PT may be a light emitting element that emits infrared light or an infrared sensor that senses infrared light. In an exemplary embodiment, if the functional module CM is an infrared sensor module, the lens LS may be omitted.

In an exemplary embodiment, when the functional module CM is a light emitting module, the functional component PT may be a light emitting element that emits light. In an exemplary embodiment, if the functional module CM is a light emitting module, the lens LS may be omitted.

In an exemplary embodiment, if the functional module CM is an iris recognition module, the functional component PT may be a sensor for recognizing the iris. In an exemplary embodiment, if the functional module CM is an iris recognition module, the lens LS may be omitted.

Referring to FIG. 2B, the display device DD may include a window member WM, a display module DM-1, and a functional module CM. The display module DM-1 may include a display panel DP-1 and an input sensing circuit ISC. The display area DA-DM and the functional area FA-DM may be defined in the display module DM.

The display panel DP-1 may include a base layer BL-1, a circuit layer CL, a light emitting element layer ELL, and an encapsulation layer TL-1.

An opening OP-CL may be defined in the circuit layer CL. The opening OP-ELL may be defined for the light emitting element layer ELL. The opening OP-ISC may be defined in the input sensing circuit ISC. The opening OP-CL of the circuit layer CL, the opening OP-ELL of the light emitting element layer ELL, and the opening OP-ISC of the input sensing circuit ISC may overlap each other.

In an exemplary embodiment, the functional area FA-DM of the display module DM may be defined by at least one of the opening OP-CL of the circuit layer CL, the opening OP-ELL of the light emitting element layer ELL, and the opening OP-ISC of the input sensing circuit ISC.

Unlike the base layer BL and the encapsulation layer TL shown in FIG. 2A, an opening is not defined in the base layer BL-1 and the encapsulation layer TL-1 shown in FIG. 2B. This is because the functional module CM may perform necessary functions even if there is no opening in the base layer BL and the encapsulation layer TL. For example, if the functional module CM is an infrared sensor, since infrared light may easily penetrate the base layer BL and the encapsulation layer TL, the functional module CM may operate normally even if there is no opening in the base layer BL and the encapsulation layer TL.

Other configurations of the display module DM-1 are substantially the same as those described with reference to FIG. 2A.

As shown in FIGS. 2A and 2B, at the lower part of the window member WM, since the lamination structure of the display modules DM and DM-1 corresponding to the display area DA-DM is different from the lamination structure of the display modules DM and DM-1 corresponding to the functional area FA-DM, the functional area FA or the boundary BD of the display device DD may be visually distinguished from the display area DA of the display device DD to the users.

The display device DD may include a normal display mode and an always-on mode.

The normal display mode may be a mode in which the user intentionally operates the display device DD to receive the image IM through the display device DD. In the normal display mode, the image IM may be displayed throughout the display area DA. In the normal display mode, all of the light emitting elements of the light emitting element layer ELL may emit light. However, in some cases, only a part of the light emitting elements may emit light in the normal display mode.

The image IM as shown in FIG. 1 may be an example of an image implemented through the display area DA in the normal display mode.

The always-on mode may be a mode for always displaying a predetermined image on a part of the display area DA even if the user does not intentionally operate the display device DD to receive the image IM through the display device DD. In the always-on mode, only a part of the light emitting elements of the light emitting element layer ELL may emit light.

In the always-on mode, since a predetermined image is always displayed in a part of the display area DA, the power consumed in the always-on mode is smaller than the power consumed in the normal display mode. Therefore, in this specification, the normal display mode may be understood as a normal mode, and the always-on mode may be understood as a low power mode.

When the user's input is applied, it may be switched from the always-on mode to the normal display mode. Also, when the user input is applied, the normal display mode may be switched to the always-on mode. At this time, the user's input may be to press or touch a portion of the display device DD. However, the input of the user is not limited thereto, and the type of the user input may be changed as necessary.

The images displayed in the always-on mode will be described below with reference to FIGS. 3A, 3B, 3C, and 3D.

Each of FIGS. 3A, 3B, 3C, and 3D illustrates a modified exemplary embodiment corresponding to the AA portion of FIG. 1. Specifically, each of FIGS. 3A, 3B, 3C and 3D illustrates that an always-on image IM-A is displayed on a part of the display area DA in an always-on mode. The always-on image IM-A may be displayed adjacent to the boundary BD between the functional area FA and the display area DA.

Figure 3A:
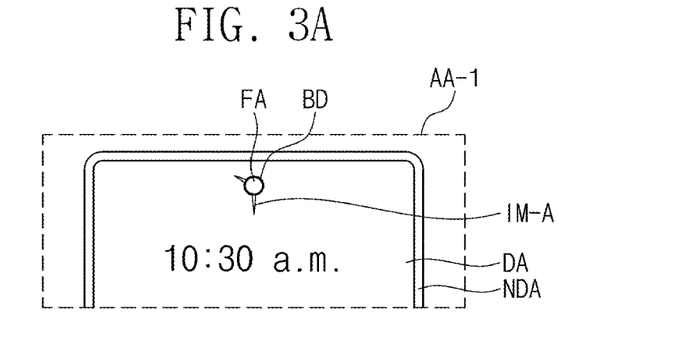

Referring to FIG. 3A, the always-on image IM-A displayed in the display area DA may be a clock needle image of the clock. At this time, the boundary BD or the functional area FA may be viewed by the user as a rotation axis on which the clock needle rotates.

Therefore, information corresponding to the current time may be formed by a combination of the always-on image IM-A and the boundary BD, or a combination of the always-on image IM-A and the functional area FA.

In FIG. 3A, the always-on image IM-A is displayed based on 10:30 am, and the always-on image IM-A may be changed corresponding to the current time. For example, the always-on image IM-A may display a clock face corresponding to the current time.

Figure 3B:
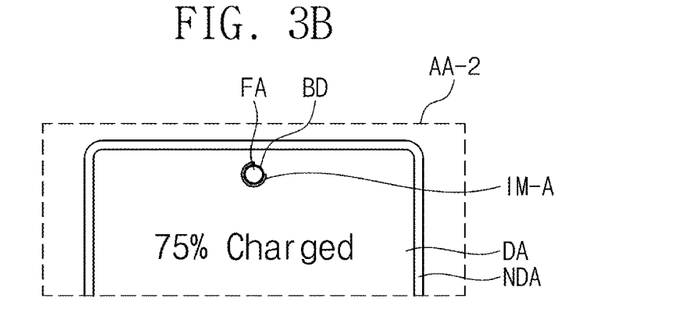

Referring to FIG. 3B, the always-on image IM-A displayed in the display area DA may be a part of the ring-shaped band. At this time, the boundary BD or the functional area FA may be viewed by the user as a reference for the rotation of the ring-shaped band.

Therefore, information corresponding to the remaining battery level may be formed by a combination of the always-on image IM-A and the boundary BD, or a combination of the always-on image IM-A and the functional area FA.

In FIG. 3B, only the 75% portion of the ring-shaped band is displayed on the always-on image IM-A based on the charging rate of 75%, and as the remaining battery level changes, the always-on image IM-A may be correspondingly changed.

Figure 3C:
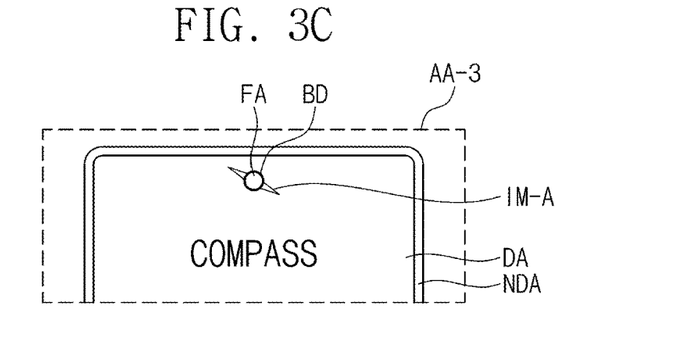

Referring to FIG. 3C, the always-on image IM-A displayed in the display area DA may be a compass needle image. At this time, the boundary BD or the functional area FA may be viewed by the user as a rotation axis on which the compass needle rotates.

Therefore, information corresponding to the point of the compass may be formed by a combination of the always-on image IM-A and the boundary BD, or a combination of the always-on image IM-A and the functional area FA.

In FIG. 3C, the always-on image IM-A is displayed based on the direction indicated by the upper end part of the display device DD, and as the direction of the upper end part of the display device DD changes, the always-on image IM-A may be correspondingly changed.

Figure 3D:
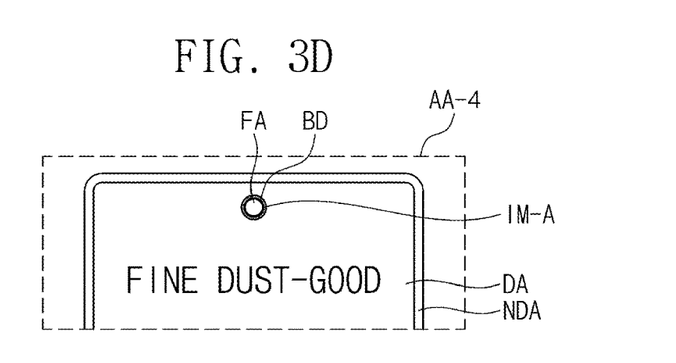

Referring to FIG. 3D, the always-on image IM-A displayed in the display area DA may be a ring-shaped band whose color changes according to the fine particulate matter density. At this time, the boundary BD or the functional area FA may be viewed by the users as a central part of the ring-shaped band.

Therefore, information corresponding to the fine particulate matter density may be formed by a combination of the always-on image IM-A and the boundary BD, or a combination of the always-on image IM-A and the functional area FA.

FIG. 3D illustrates that the always-on image IM-A displays a state in which the fine particulate matter density being low, and the always-on image IM-A may be correspondingly changed as the fine particulate matter density varies. For example, when the fine particulate matter density is low, the color of the always-on image IM-A is green, and when the fine particulate matter density is normal, the color of the always-on image IM-A is yellow, when the fine particulate matter density is high, the color of the always-on image IM-A may be red.

If the functional area FA and boundary BD are visible to users, the aesthetics of the display device DD may be deteriorated, but as shown in FIGS. 3A, 3B, 3C, and 3D, by displaying the always-on image IM-A adjacent to the functional area FA and boundary BD, the display device DD may provide useful information to the users with improved user recognition.

Figure 4:
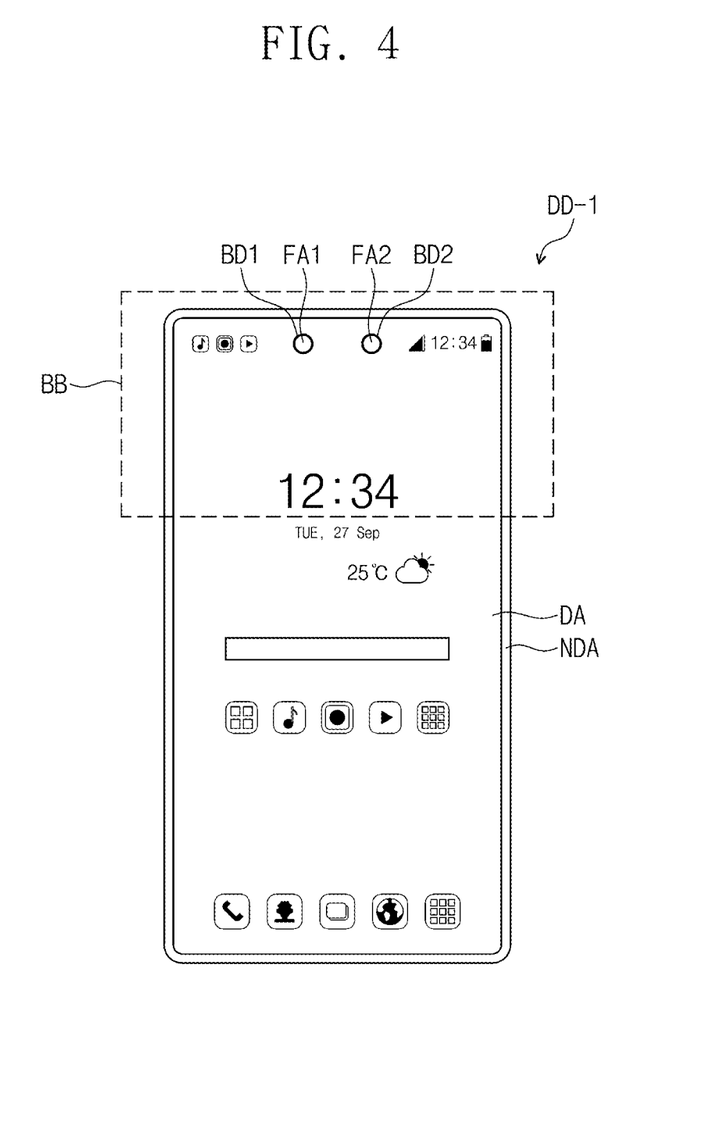
FIG. 4 illustrates an exemplary display device constructed according to an exemplary embodiment.

FIG. 4 illustrates an exemplary display device DD-1 according to an exemplary embodiment.

As shown in FIG. 4, a display area DA, a non-display area NDA, a first functional area FA1, and a second functional area FA2 may be defined in the display device DD-1.

Each of the first functional area FA1 and the second functional area FA2 may be defined as an area where an image WI is not displayed and a user may perform a specific function. The specific function may include, for example, a photographing function, an external object proximity detection function, an infrared ray detection function, an iris recognition function, a face recognition function, or a light emission function. To perform this specific function, the functional module CM shown in FIGS. 2A and 2B may be disposed in each of the first functional area FA1 and the second functional area FA2.

Each of the first functional area FA1 and the second functional area FA2 may be surrounded by the display area DA. The first boundary BD1 between the first functional area FA1 and the display area DA may be viewed by the users of the display device DD. The second boundary BD2 between the second functional area FA2 and the display area DA may be viewed by the users of the display device DD. In addition, the first functional area FA1 and the second functional area FA2 themselves are distinguished from the display area DA and may be viewed by users.

Other descriptions with respect to FIG. 4 are substantially the same as those described with reference to FIG. 1.

Each of FIGS. 5A, 5B, 5C, and 5D illustrates a modified exemplary embodiment corresponding to the BB portion of FIG. 4. Specifically, each of FIGS. 5A, 5B, 5C, and 5D illustrates that an always-on image IM-A is displayed on a part of the display area DA in an always-on mode. At least a part of the always-on image IM-A may be displayed adjacent to the boundary BD between the functional area FA and the display area DA.

Figure 5A:
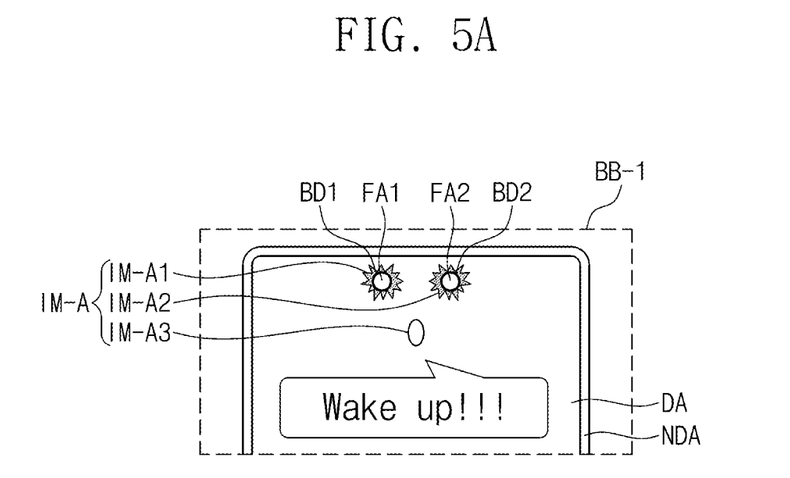

Referring to FIG. 5A, the always-on image IM-A may include first to third always-on images IM-A1, IM-A2, and IM-A3. The always-on image IM-A shown in FIG. 5A is an example of an emoticon (or an emoji) that may be displayed in a situation in which the display device DD-1 provides an alarm signal.

The first always-on image IM-A1 is an image formed adjacent to the first functional area FA1, and the second always-on image IM-A2 is an image formed adjacent to the second functional area FA2. The first always-on image IM-A1 and the second always-on image IM-A2 may be recognized by the user as the character's eyes.

The third always-on image IM-A3 may be formed apart from the first always-on image IM-A1 and the second always-on image IM-A2. The third always-on image IM-A3 may be recognized by the user as the character's mouth.

Therefore, information corresponding to the face shape of the character may be formed by combining the first to third always-on images IM-A1, IM-A2, and IM-A3.

In an exemplary embodiment, even if the first always-on image IM-A1 and the second always-on image IM-A2 are not displayed, since the first functional area FA1 and the second functional area FA2 are visible to the users, information corresponding to the face shape of the character may be formed by a combination of the first functional area FA1, the second functional area FA2, and the third always-on image IM-A3.

In an exemplary embodiment, even if the first always-on image IM-A1 and the second always-on image IM-A2 are not displayed, since the first boundary BD1 and the second boundary BD2 are visible to the users, information corresponding to the face shape of the character may be formed by a combination of the first boundary BD1, the second boundary BD2, and the third always-on image IM-A3.

Figure 5B:
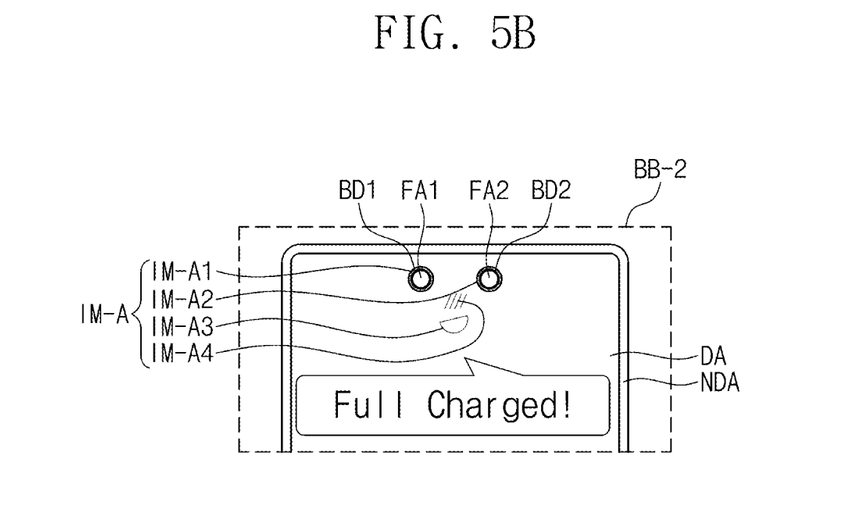

Referring to FIG. 5B, the always-on image IM-A may include first to fourth always-on images IM-A1, IM-A2, IM-A3 and IM-A4. The always-on image IM-A shown in FIG. 5B is an example of an emoticon that may be displayed when the battery of the display device DD-1 is fully charged.

The first always-on image IM-A1 is an image formed adjacent to the first functional area FA1, and the second always-on image IM-A2 is an image formed adjacent to the second functional area FA2. The first always-on image IM-A1 and the second always-on image IM-A2 may be recognized by the user as the character's eyes.

The third always-on image IM-A3 may be formed apart from the first always-on image IM-A1 and the second always-on image IM-A2. The third always-on image IM-A3 may be recognized by the user as the character's mouth.

The fourth always-on image IM-A4 may be formed apart from the first always-on image IM-A1 and the second always-on image IM-A2. The fourth always-on image IM-A4 may be recognized as a supplementary image or a character's nose for showing the expression of the character to the user.

Therefore, information corresponding to the face shape of the character may be formed by combining the first to fourth always-on images IM-A1, IM-A2, IM-A3, and IM-A4.

In an exemplary embodiment, even if the first always-on image IM-A1 and the second always-on image IM-A2 are not displayed, since the first functional area FA1 and the second functional area FA2 are visible to the users, information corresponding to the face shape of the character may be formed by a combination of the first functional area FA1, the second functional area FA2, the third always-on image IM-A3, and the fourth always-on image IM-A4.

In an exemplary embodiment, even if the first always-on image IM-A1 and the second always-on image IM-A2 are not displayed, since the first boundary BD1 and the second boundary BD2 are visible to the users, information corresponding to the face shape of the character may be formed by a combination of the first boundary BD1, the second boundary BD2, the third always-on image IM-A3, and the fourth always-on image IM-A4.

Figure 5C:
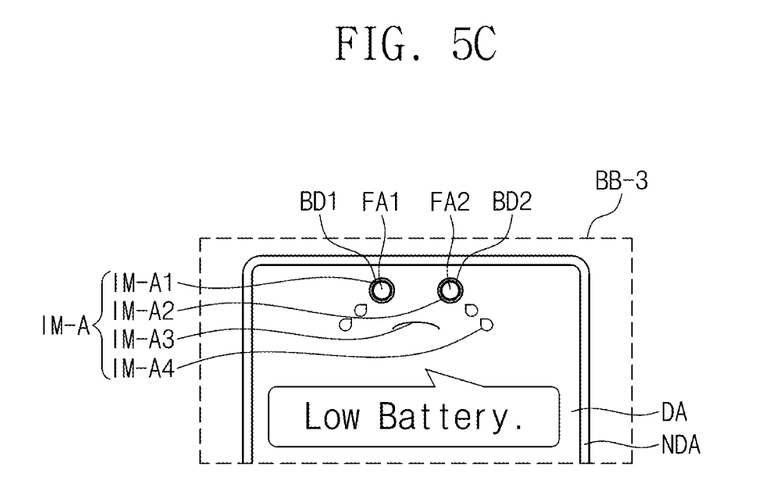

Referring to FIG. 5C, the always-on image IM-A may include first to fourth always-on images IM-A1, IM-A2, IM-A3 and IM-A4. The always-on image IM-A shown in FIG. 5B is an example of an emoticon that may be displayed in a situation where the battery of the display device DD-1 is insufficient.

The first always-on image IM-A1 is an image formed adjacent to the first functional area FA1, and the second always-on image IM-A2 is an image formed adjacent to the second functional area FA2. The first always-on image IM-A1 and the second always-on image IM-A2 may be recognized by the user as the character's eyes.

The third always-on image IM-A3 may be formed apart from the first always-on image IM-A1 and the second always-on image IM-A2. The third always-on image IM-A3 may be recognized by the user as the character's mouth.

The fourth always-on image IM-A4 may be formed apart from the first always-on image IM-A1 and the second always-on image IM-A2. The fourth always-on image IM-A4 may be recognized as a supplementary image or a character's tears for showing the expression of the character to the user. Specifically, in FIG. 5C, the fourth always-on image IM-A4 may be recognized as a tear formed in the periphery of the character's eyes.

Therefore, information corresponding to the face shape of the character may be formed by combining the first to fourth always-on images IM-A1, IM-A2, IM-A3, and IM-A4.

In an exemplary embodiment, even if the first always-on image IM-A1 and the second always-on image IM-A2 are not displayed, since the first functional area FA1 and the second functional area FA2 are visible to the users, information corresponding to the face shape of the character may be formed by a combination of the first functional area FA1, the second functional area FA2, the third always-on image IM-A3, and the fourth always-on image IM-A4.

In an exemplary embodiment, even if the first always-on image IM-A1 and the second always-on image IM-A2 are not displayed, since the first boundary BD1 and the second boundary BD2 are visible to the users, information corresponding to the face shape of the character may be formed by a combination of the first boundary BD1, the second boundary BD2, the third always-on image IM-A3, and the fourth always-on image IM-A4.

Figure 5D:
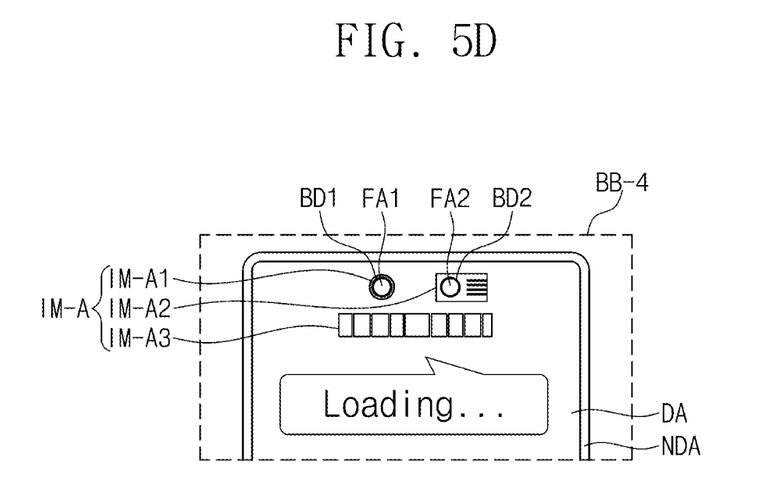

Referring to FIG. 5D, the always-on image IM-A may include first to third always-on images IM-A1, IM-A2, and IM-A3. The always-on image IM-A shown in FIG. 5D is an example of an emoticon that may be displayed in a situation where the display device DD-1 is downloading a specific file or in a situation of being loaded to execute a specific file.

The first always-on image IM-A1 is an image formed adjacent to the first functional area FA1, and the second always-on image IM-A2 is an image formed adjacent to the second functional area FA2. The first always-on image IM-A1 and the second always-on image IM-A2 may be recognized by the user as the character's eyes.

The third always-on image IM-A3 may be formed apart from the first always-on image IM-A1 and the second always-on image IM-A2. The third always-on image IM-A3 may be recognized by the user as the character's mouth. Alternatively, the third always-on image IM-A3 may be recognized by the user as an image for indicating the progress bar to which the display device DD-1 downloads the file or an image for displaying the degree of loading of the file.

Therefore, information corresponding to the face shape of the character may be formed by combining the first to third always-on images IM-A1, IM-A2, and IM-A3.

In an exemplary embodiment, even if the first always-on image IM-A1 and the second always-on image IM-A2 are not displayed, since the first functional area FA1 and the second functional area FA2 are visible to the users, information corresponding to the face shape of the character may be formed by a combination of the first functional area FA1, the second functional area FA2, and the third always-on image IM-A3.

In an exemplary embodiment, even if the first always-on image IM-A1 and the second always-on image IM-A2 are not displayed, since the first boundary BD1 and the second boundary BD2 are visible to the users, information corresponding to the face shape of the character may be formed by a combination of the first boundary BD1, the second boundary BD2, and the third always-on image IM-A3.

Although FIGS. 5A, 5B, 5C, and 5D illustrate exemplarily forming predetermined information utilizing the first functional area FA1 and the second functional area FA2, exemplary embodiments are not limited thereto, and may be variously expanded.

According to an exemplary embodiment, it is possible to provide a display device with improved esthetics in the always-on mode. Further, it is possible to provide a display device that continuously provides necessary information to the user through the always-on mode.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display panel comprising:
   a first area defined by an area corresponding to an opening in the display panel, the first area configured not to display an image; and
   a display area surrounding the first area, the display area configured to display an image; and
   a first functional module disposed in the opening at a lower part of the display panel overlapping the first area, the first functional module configured to receive light from the opening and/or emit light through the opening, wherein the display panel is configured to display a first boundary image in a part of the display area adjacent to a boundary between the first area and the display area, wherein the display device is configured to provide a predetermined information to a user through a combination of the first area and the first boundary image.

2. The display device of claim 1, wherein the predetermined information comprises status information indicating a current status.

3. The display device of claim 2, wherein the status information comprises information corresponding to a current time.

4. The display device of claim 2, wherein the status information comprises information corresponding to a remaining battery level of the display device.

5. The display device of claim 2, wherein the status information comprises information corresponding to points of a compass.

6. The display device of claim 1, wherein the predetermined information corresponds to an alarm signal.

7. The display device of claim 1, wherein the predetermined information is an emoticon having a specific expression.

8. The display device of claim 1, wherein the first area overlaps an opening formed in the display panel.

9. The display device of claim 1, wherein the display panel comprises a base layer, a circuit layer disposed on the base layer, a light emitting element layer disposed on the circuit layer, and an encapsulation layer sealing the light emitting element layer, wherein the first area overlaps a first opening formed on the circuit layer and a second opening formed on the light emitting element layer.

10. The display device of claim 1, wherein the first functional module further comprise a sensor for receiving light incident through the opening.

11. The display device of claim 1, wherein the first functional module further comprises a light emitting module for emitting light through the opening.

12. The display device of claim 1, further comprising a second area surrounded by the display area, the second area configured not to display an image.

13. The display device of claim 12, further comprising a second functional module disposed under the display panel overlapping the second area.

14. The display device of claim 13, wherein the display panel is configured to display a second boundary image in a part of the display area adjacent to the second area in response to the display device being in a first mode, wherein the display device is configured to, in the first mode, provide the predetermined information to the user by the first area, the second area, the first boundary image, and the second boundary image.

15. The display device of claim 1, wherein the display panel is configured to:

display the first boundary image in response to the display device being in a first mode;

display a general image in the entire display area in response to the display device being in a second mode; and switch from the first mode to the second mode according to an input signal received from the user.

16. The display device of claim 15, wherein the first mode is a lower power mode compared to the second mode.

* * * * *